United States Patent [19]
Igarashi et al.

[11] 4,333,984
[45] Jun. 8, 1982

[54] HEAT-SENSITIVE RECORDING SHEETS

[75] Inventors: Akira Igarashi; Hiroharu Matsukawa, both of Fujinomiya, Japan

[73] Assignee: Fuji Photo Film Co., Ltd., Kanagawa, Japan

[21] Appl. No.: 217,641

[22] Filed: Dec. 18, 1980

[30] Foreign Application Priority Data

Dec. 18, 1979 [JP] Japan ............................... 54/164217

[51] Int. Cl.³ ........................... C09J 7/02; G03C 1/52
[52] U.S. Cl. .................................... 428/336; 428/913; 428/341; 428/342; 428/488; 428/537; 282/27.5; 430/338; 106/21
[58] Field of Search .................. 430/338, 538; 106/21; 428/913, 332, 336, 341, 342, 488, 537; 282/27.5

[56] References Cited

U.S. PATENT DOCUMENTS

| | | | |
|---|---|---|---|
| 3,445,261 | 5/1969 | Talvalkar | 428/913 |
| 3,460,964 | 8/1969 | Dunham | 106/21 |
| 3,501,298 | 3/1970 | Crawford | 430/538 |
| 3,825,432 | 7/1974 | Futaki et al. | 106/21 |
| 4,153,609 | 5/1979 | Petitpierre et al. | 106/21 |
| 4,218,504 | 8/1980 | Yamato et al. | 106/21 |
| 4,226,912 | 10/1980 | Iwasaki et al. | 106/21 |
| 4,247,595 | 1/1981 | Nomura et al. | 428/913 |

*Primary Examiner*—Won H. Louie, Jr.
*Attorney, Agent, or Firm*—Sughrue, Mion, Zinn, Macpeak and Seas

[57] ABSTRACT

A heat-sensitive recording sheet which comprises a support, a white or light-colored pigment coating layer having an oil absorption determined by JIS K5101 of 75 ml/100 g or more on the support, and a heat-sensitive color forming layer comprising an electron donor colorless dye and an electron acceptor compound on the coating layer.

12 Claims, No Drawings

HEAT-SENSITIVE RECORDING SHEETS

BACKGROUND OF THE INVENTION

The present invention relates to heat-sensitive recording sheets.

The term "heat-sensitive recording sheet" is used herein to describe a sheet which is capable of being used to produce a recorded image by utilizing a physical or chemical change of substances by heat energy, and a large number of processes for heat-sensitive recording sheets have been studied.

Heat-sensitive recording sheets utilizing a physical change of substances by heat include the so-called wax-type heat-sensitive recording sheet which has been used for, for example, electrocardiograms. Further, heat-sensitive recording sheets utilizing a chemical change by heat involve various color formation mechanisms and, particularly, the so-called two-component color heat-sensitive recording sheets are typical examples.

A two-component color heat-sensitive recording sheet is one which is produced by finely dispersing two kinds of heat-reactive compounds, mixing them with a binder and applying the resulting mixture to a support so that the two kinds of heat-reactive compounds are separated from each other by the binder. Recording is carried out by utilizing the color reaction which occurs on melting of one or both of the compounds by applying heat so that they come into contact with each other. These two kinds of heat-reactive compounds are generally an electron donor compound and an electron acceptor compound. Many combinations of these compounds which can be roughly classified as those which form images of metal compounds and those which form dye images, are known.

Examples of combinations forming images of metal compounds are those using organic reducing agents including phenols, etc., chelating agents, sulfur compounds and amino compounds as the electron donor compound and organic metal salts as the electron acceptor compound. Both of them react on heating and form metals, metal complex compounds or metal sulfides, etc., to produce color images. Specific examples of such combinations include combinations of thiourea and heavy metal salts (e.g., as disclosed in U.S. Pat. No. 2,740,895), combinations of gallic acid and metal salts of stearic acid (e.g., as disclosed in U.S. Pat. Nos. 2,663,654–2,663,657), combinations of hydroquinone and silver behenate (e.g., as disclosed in U.S. Pat. No. 3,031,329) and combinations of hexamethylenetetramine and tin compounds (e.g., as disclosed in U.S. Pat. No. 2,813,043), etc.

Examples of combinations forming dye images, include those using electron donor colorless dyes as the electron donor compound and acid substances including phenols as the electron acceptor compound (e.g., as disclosed in Japanese Patent Publication Nos. 4160/68 and 3680/69).

These two component color heat-sensitive recording sheets have a number of advantages in that (1) development is not required because of the primary color formation, (2) the quality of the paper closely resembles that of conventional paper and (3) they can be easily handled. Particularly, where colorless dyes are used as the electron donor compound, such sheets have great utilitarian value because they possess additional advantages in that (4) the color density formed is high and (5) it is easy to produce heat-sensitive recording sheets in which various color hues can be formed. Accordingly, this type is the most widely utilized as heat-sensitive recording elements.

Recently heat-sensitive recording sheets having the above described characteristics have been employed as image receiving recording papers for facsimile communication use.

In using heat-sensitive recording sheets as a facsimile recording paper, the structure of the recording device is simplified because no development step is required, and maintenance advantages arise because supplies other than the recording paper are not required. However, thermal recording has a disadvantage. Namely, the recording rate for thermal recording is low. An important reason for the low rate is believed to be the inferior thermal response of the thermal recording element and the heat-sensitive recording sheet. Although thermal recording elements having a good thermal response have been developed recently, no heat-sensitive recording sheet is capable of sufficiently responding thereto. Accordingly, development of such heat-sensitive recording sheets has been desired.

SUMMARY OF THE INVENTION

An object of the present invention is to provide heat-sensitive recording sheets having a high thermal response capable of being used for thermal recording at a high rate.

In detail, an object is to provide a heat-sensitive recording paper by which sufficient color density can be obtained by thermal recording with a heat pulse of 5 ms or less, in contrast to prior thermal recording which has been carried out with a heat pulse of 10 ms or so.

The object of the present invention has been attained using a heat-sensitive recording sheet which comprises a support, a white or light-colored pigment coating layer having an oil absorption as determined by JIS K5101 of 75 ml/100 g or more on the support, and a heat-sensitive color forming layer comprising an electron donor colorless dye and an electron acceptor compound as main components on the coating layer.

DETAILED DESCRIPTION OF THE INVENTION

Examples of construction of prior heat-sensitive recording sheets include those which are prepared by dispersing an electron donor colorless dye (referred to as a "color former", hereinafter) and an electron acceptor compound (referred to as a "developer", hereinafter) in a binder such as polyvinyl alcohol and applying the dispersion to a support such as paper. When these heat-sensitive recording sheets are heated, at least one of the color former and the developer melts and both of them react to form a recorded image. There are, however, many problems in practical use with these materials. One problem is that the recording device or element is soiled during recording. In order to prevent such soiling an oil absorbent substance such as an inorganic pigment is dispersed in the binder. Further, aliphatic acid amides, aliphatic acids or metal soaps, etc. are added to the binder in order to improve the releasing property to the element. Accordingly, heat-sensitive recording sheets, in addition to the color former and the developer which directly contribute to color formation, are generally composed of pigments, waxes or additives, etc. applied to the support in amounts of several times the amount of the color former and the developer.

This approach is quite disadvantageous from the standpoint of the amount of energy required for recording. One of the disadvantages is that large amounts of color former and developer are required in order to obtain a recorded image having the same density, since the color forming components are highly diluted, with a reduction thereby of the utilization thereof. Another disadvantage is that the temperature of the color forming layer does not increase even if the same amount of energy is applied, because the amount of the coating becomes large and increases the heat capacity of the color forming layer, by which a sufficient recording density cannot be obtained and, as a result, a large amount of thermal energy is required to achieve such.

As a result of research on heat-sensitive recording sheets capable of being used for recording using less thermal energy, it has now been unexpectedly found that when an oil absorbent layer comprising a pigment having a high oil absorbing property is provided on the support and a heat-sensitive color forming layer comprising a color former and a developer as main components is applied on the oil absorbing layer, less thermal energy is used.

More specifically, the recording sheets of the present invention have a good response to very short heat pulses, by which a sufficient color density is obtained with a low amount of thermal energy. While not desiring to be bound it is believed that almost all energy generated on the element contribute to color formation, because the heat-sensitive recording layer comprising the color former and the developer as main components is formed as the top layer of the recording sheet which is separated from the pigment having a large heat capacity. Further, soiling of the thermal element and adhesion to the thermal element hardly occurs with the heat recording sheets of the present invention. It is believed that the color former and the developer melted by heat of the thermal element are rapidly absorbed in the pigment coating layer because the pigment coating layer directly under the heat-sensitive recording layer has a high oil absorbing property. Further, notably, the developed color is formed on the surface of the oil absorbent pigment layer, and consequently, a very high reflection density is obtained, because the absorption occurs chiefly at the interface between the recording layer and the oil absorbent pigment layer. Moreover, since the pigment layer may serve as a heat insulator, the color density formed by application of a short heat pulse unexpectedly increases in comparison with that of prior known recording sheets having a single coating layer.

The heat-sensitive recording sheets of the present invention can be produced by applying sequentially or at the same time the first layer containing a white or light-colored pigment on the support and the second layer comprising the heat-sensitive coloring layer on the first layer.

Paper is generally used as the support. However, if desired, synthetic paper or synthetic resin, etc. can be used. Suitable examples of the synthetic resins which can be used as supports are, for example, polyethylene terephthalate, cellulose triacetate, vinylidene chloride, etc. An appropriate and suitable thickness for the support ranges from about 40 μm to 100 μm.

The oil absorbent pigment layer provided on the support has an oil absorption as measured by JIS K5101 of 75 ml/100 g or more, preferably 100 ml/100 g or more. Further, the pigment preferably has a volume average particle size of 5.0 μm or less, by which a coated paper having high degree of smoothness can be obtained.

Examples of suitable materials having an oil absorption of 75 ml/100 g or more include kaolin, calcined kaolin, talc, agalmatolite, diatomaceous earth, calcium carbonate, aluminum hydroxide, magnesium carbonate, magnesium hydroxide, titanium oxide, barium carbonate and urea-formaldehyde filler. These pigments may be subjected to a surface treatment so as to increase the oil absorption, if desired. The pigment coating layer is desirably coated in an amount of about 1 to 15 $g/m^2$ and preferably 2 to 7 $g/m^2$.

The heat-sensitive color forming layer provided on the pigment coating layer comprises a color former and a developer as main components and, if necessary, waxes, metal soaps or ultraviolet light absorbing agents, etc. Further, a white pigment may be added to the heat-sensitive color forming layer to increase the whiteness of the heat-sensitive color forming layer. The amount of a white pigment which can be employed is 20% or less, preferably 10% or less, based on the sum total of the color former and the developer. When the thickness of the heat-sensitive color forming layer is increased, a high color density can be obtained, but phenomena such as soiling of the recording element or streaking at high-speed recording, etc., occur. Accordingly, the thickness of the heat-sensitive color forming layer preferably is about 7 μm or less and preferably 5 μm or less. The lower limit of the thickness depends on the color density, but a thickness of 2 μm or more is required. Further, in order to obtain recorded images of high density at high-speed recording, it is necessary for the amount of color forming components, namely the sum total of the color former and the developer, in the heat-sensitive color forming layer to be sufficiently larger than that of other additives. Preferably, the amount of the sum of the color former and the developer is 50% or more and particularly 65% or more, based on the total solid content excluding the binder.

Preferred amounts of the color former in the heat-sensitive color forming layer range from about 0.10 $g/m^2$ to about 0.40 $g/m^2$. When the color former content is less than about 0.10 $g/m^2$, sufficient color density cannot be obtained and when the color former content exceeds about 0.40 $g/m^2$, economical disadvantages occur.

Suitable amounts of the developer used are 1 to 10 times, preferably 2 to 5 times, based on the amount of the color former used. The developer is present in at least an equivalent amount (wt%) based on the amount of the color former to completely cause coloration of the color former. When the amount of developer used exceeds 10 times the amount of the color former, the heat capacity and the heat of fusion in the heat-sensitive color forming layer per unit amount of color former are increased, and as a result, the color density is somewhat reduced.

There is no particular limitation on the color formers which can be used in this invention and suitable examples are those used for conventional pressure-sensitive copying papers or heat-sensitive recording papers. Specific examples include (1) triarylmethane compounds such as 3,3-bis-(p-dimethylaminophenyl)-6-dimethylaminophthalide (Crystal Violet Lactone), 3,3-bis-(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis-(1,2-dimethylindol-3-yl)-5-dimethylaminophthalide, 3,3-bis-(1,2-dimethylindol-3-yl)-6-dimethylaminophthalide, 3,3-bis-(9-ethylcarbazol-3-yl)-5-dimethylaminophthalide, 3,3-bis-(2-phenylindol-3-yl)-5-dimethylaminophthalide and 3-p-dimethylaminophenyl-3-(1-methylpyrol-2-yl)-6-dimethylaminophthalide, etc.; (2) diphenylmethane compounds such as 4,4'-bis-dimethylaminobenzhydrin benzyl ether, N-halophenyl leuco Auramine and N-2,4,5-trichlorophenyl leuco Auramine, etc.; (3) xanthene compounds such as rhodamine B anilinolactam, rhodamine B p-nitroanilinolactam, rhodamine B p-chloroanilinolactam, 3-diethylamino-7-dibenzylaminofluoran, 3-diethylamino-7-octylaminofluoran, 3-diethylamino-7-phenylfluoran, 3-diethylamino-7(3,4-diechloroanilino)fluoran, 3-diethylamino-7-(2-chloroanilino)fluoran, 3-diethylamino-6methyl-7-anilinofluoran, 3-piperidino-6-methyl-7-anilinofluoran, 3-ethyl-tolylamino-6-methyl-7-anilinofluoran, 3-ethyl-tolyl-amino-6-methyl-7-phenethylfluroran and 3-diethylamino-7-(4-nitroanilino)fluoran, etc.; (4) thiazine compounds such as benzoyl leuco Methylene Blue and p-nitrobenzoyl leuco Methylene Blue, etc.; (5) spiro compounds such as 3-methyl-spirodinaphthopyran, 3-ethyl-spiro-dinaphthopyran, 3,3'-dichlorospiro-dinaphthopyran, 3-benzyl-spiro-dinaphthopyran, 3-methyl-naphtho-(3-methoxybenzo)spiropyran and 3-propyl-spirodibenzopyran, etc.; and mixtures of them. These can be selected based upon their end use and the characteristics desired, with triarylmethane compounds and xanthene compounds being preferred.

Developers used in the present invention include phenol derivatives and aromatic carboxylic acid derivatives, and bisphenols are particularly preferred for use. Examples of suitable phenols include p-octylphenol, p-tert-butylphenol, p-phenylphenol, 1,1-bis-(p-hydroxyphenyl)propane, 2,2-bis-(p-hydroxyphenyl)propane, 1,1-bis-(p-hydroxyphenyl)pentane, 1,1-bis-(p-hydroxyphenyl)hexane, 2,2-bis-(p-hydroxyphenyl)hexane, 1,1-bis-(p-hydroxyphenyl)-2-ethyl-hexane and 2,2-bis-(4-hydroxy-3,5-dichlorophenyl)propane, etc.

Exemplary aromatic carboxylic acid derivatives are p-hydroxybenzoic acid, ethyl p-hydroxybenzoate, butyl p-hydroxybenzoate, 3,5-di-tert-butylsalicylic acid, 3,5-di-α-methylbenzylsalicylic acid and polyvalent metal salts of these carboxylic acids such as the zinc and aluminum salts.

Suitable waxes include not only paraffin wax, carnauba wax, microcrystalline wax and polyethylene wax, but also higher aliphatic acid amides, for example, stearic acid amide and ethylenebisstearamide and higher aliphatic acid esters, etc.

Appropriate metal soaps are polyvalent metal salts, such as the zinc, aluminum, calcium, lead, etc., salts of higher aliphatic acids, for example, zinc stearate, aluminum stearate, calcium stearate and zinc oleate, etc.

Higher aliphatic acid amides are particularly effective since the melting point of the developer is reduced and coloration of the color former is facilitated. Zinc salts are particularly effective in preventing soiling of thermal recording elements. These substances are dispersed in the binder used. Suitable binders are generally water soluble binders, examples of which include polyvinyl alcohol, hydroxyethylcellulose, hydroxypropylcellulose, ethylene-maleic acid anhydride copolymers, styrene-maleic acid anhydride copolymers, isobutylene-maleic acid anhydride copolymers, polyacrylic acid, starch derivatives, casein and gelatin, etc. In order to improve the water resistance of these binders, a water proofing agent (gelling agent or crosslinking agent) can be added to the binders or a hydrophobic polymer emulsion such as a styrene-butadiene rubber latex or an acrylic resin emulsion, etc. can be added to the binders.

Examples of the invention are given below, but the present invention is not, of course, to be construed as being limited to these examples. Unless otherwise indicated all parts, percents, ratios and the like are by weight and all oil absorption values were measured by JIS K5101.

EXAMPLE 1

100 g of calcined kaolin (oil absorption: 150 mg/100 g) was added to 100 g of a 1% solution of hexametaphosphoric acid and dispersed for 5 minutes using a homogenizer. 40 g of a 50% styrene-butadiene rubber latex was added thereto and the resulting mixture was sufficiently blended. After the mixture was applied to a base paper having a weight of 50 g/m$^2$ in a coating amount of 5 g/m$^2$ (dry basis) and dried, the paper was subjected to calendering under a pressure of 10 kg w/cm to obtain a support paper.

20 g of Crystal Violet Lactone was added to 100 g of a 5% aqueous solution of polyvinyl alcohol (degree of polymerization: 500; saponification value: 99%) and dispersed with a ball mill.

100 g of 2,2-bis-(p-hydroxyphenyl)propane was added to 500 g of a 5% aqueous solution of polyvinyl alcohol. After the mixture was dispersed using a ball mill, the resulting dispersion was mixed with the dispersion of Crystal Violet Lactone. 30 g of a 21% dispersion of stearic acid amide was then added to produce a heat-sensitive coating composition. This coating composition was applied to the support paper coated with the above described calcined kaolin in a coating amount of 3 g/m$^2$ using a Mayer bar. The paper was subjected to calendering under a pressure of 10 kg w/cm to produce a coated paper. The thickness of the heat-sensitive recording layer was about 2.5 μm.

When recording was carried out by contacting a thermal recording element closely with this recording paper under a pressure of 500 g/cm$^2$ and applying a current pulse of 4 ms (the temperature of the element increased to 330° C. when such was not in contact with the recording paper), a recording density (reflection density at 610 nm) of 1.05 was obtained. Further, soiling of the recording element and adhesion did not occur.

EXAMPLE 2

The procedures of Example 1 were repeated but calcium carbonate which had been subjected to a surface treatment (oil absorption: 85 ml/100 g), was used instead of calcined kaolin. The recording density was 1.18 but slight soiling of the recording element was observed. Adhesion did not occur at all.

COMPARATIVE EXAMPLE 1

The procedures of Example 1 were repeated but low oil absorbent talc (oil absorption: 60 ml/100 g) was used instead of calcined kaolin. Adhesion occurred between the thermal recording element and the recording paper and the thermal element was solid after separation. The average recording density was as low as 0.67. Further, serious soiling of the thermal recording element occurred.

COMPARATIVE EXAMPLE 2

The procedures of Example 1 were repeated but a paper which was not coated with calcined kaolin was used as the support paper. Adhesion of the thermal recording element was marked and the density could not be measured.

COMPARATIVE EXAMPLE 3

After a dispersion containing Crystal Violet Lactone and 2,2-bis-(p-hydroxyphenyl)propane was prepared in the same manner as described in Example 1, 50 g of a 21% aqueous dispersion of stearic acid amide was added thereto. Further, 200 g of calcined kaolin and 400 g of a 10% aqueous solution of polyvinyl alcohol was added thereto. After dispersion the dispersion was applied to the support paper of a weight of 50 g/m$^2$ in a coating amount of 8 g/m$^2$ (dry basis). After drying it was subjected to calendering under a pressure of 10 kg w/cm to produce a coated paper.

When recording was carried out in the same manner as described in Example 1 using this coated paper by applying a current pulse of 5 ms to the thermal recording element, the density was 0.71. When the period of the electric pulse was increased to 10 ms (the temperature of the element increased to 390° C. when not in contact with the recording paper), the density increased to 1.12. When the heat-sensitive recording paper described in Example 1 was used for recording in the same manner at a pulse period of 10 ms the recording density was 1.19. In no case did soiling of the element and adhesion occur.

As described above, using the heat-sensitive recording paper of the present invention, it became possible to obtain recordings of high density as compared to prior art heat-sensitive recording papers when high-speed recording is conducted.

While the invention has been described in detail and with reference to specific embodiments thereof, it will be apparent to one skilled in the art that changes and modifications can be made therein without departing from the spirit and scope thereof.

What is claimed is:

1. A heat-sensitive recording sheet which comprises a support,
a white or light-colored pigment coating layer having an oil absorption determined by JIS K5101 of 75 ml/100 g or more on the support, and
a heat-sensitive color forming layer comprising an electron donor colorless dye and an electron acceptor compound on said coating layer wherein recording occurs due to a color reaction upon melting one or both of said dye and said acceptor.

2. The heat-sensitive recording sheet according to claim 1, wherein the thickness of the heat-sensitive color forming layer is about 7 μm or less.

3. The heat-sensitive recording sheet according to claim 1, wherein the support is paper, a synthetic paper or a synthetic resin film.

4. The heat-sensitive recording sheet according to claim 1, wherein the oil absorption is 100 ml/100 g or more.

5. The heat-sensitive recording sheet according to claim 1, wherein the pigment is kaolin, calcined kaolin, talc, agalmatolite, diatomaceous earth, calcium carbonate, aluminum hydroxide, magnesium carbonate, magnesium hydroxide, titanium oxide, barium carbonate, or urea-formaldehyde filler.

6. The heat-sensitive recording sheet of claim 1, wherein said electron donor colorless dye is a triarylmethane compound or a xanthene compound and wherein said electron acceptor compound is a phenol or an aromatic carboxylic acid.

7. The heat-sensitive recording sheet according to claim 1, wherein said pigment coating layer is coated in an amount of about 1 to 15 g/m$^2$.

8. The heat-sensitive recording sheet according to claim 1, wherein the pigment is calcined kaolin.

9. The heat-sensitive recording sheet according to claim 1, wherein the pigment is talc.

10. The heat-sensitive recording sheet according to claim 1, wherein the pigment is agalmatolite.

11. The heat-sensitive recording sheet according to claim 1, wherein the pigment is diatomaceous earth.

12. The heat-sensitive recording sheet according to claim 1, wherein the pigment is calcium carbonate.

* * * * *